(12) United States Patent
Jiang et al.

(10) Patent No.: US 9,410,071 B1
(45) Date of Patent: Aug. 9, 2016

(54) OIL-BASED VISCOSIFIER OF DRILLING FLUID AND THE PREPARATION METHOD THEREOF

(71) Applicant: China University of Petroleum (Beijing), Beijing—Changping District (CN)

(72) Inventors: Guancheng Jiang, Beijing (CN); Xianbin Huang, Beijing (CN); Guangchang Ma, Beijing (CN); Xi Wang, Beijing (CN); Kun Zhang, Beijing (CN); Wei Wan, Beijing (CN)

(73) Assignee: CHINA UNIVERSITY OF PETROLEUM (BEIJING), Changping District Beijing (CN)

( * ) Notice: Subject to any disclaimer, the term of this patent is extended or adjusted under 35 U.S.C. 154(b) by 0 days.

(21) Appl. No.: 14/878,735

(22) Filed: Oct. 8, 2015

(30) Foreign Application Priority Data

Apr. 3, 2015 (CN) .......................... 2015 1 0158572

(51) Int. Cl.
*C09K 8/34* (2006.01)
(52) U.S. Cl.
CPC ........................................ *C09K 8/34* (2013.01)
(58) Field of Classification Search
CPC .............. C09K 8/03; C09K 8/24; C09K 8/32; C09K 8/34; E21B 43/16
USPC ........................................................ 508/119
See application file for complete search history.

(56) References Cited

U.S. PATENT DOCUMENTS

2013/0324443 A1* 12/2013 Wang .................... C04B 24/163
507/121

FOREIGN PATENT DOCUMENTS

CN 103146361 * 6/2013

OTHER PUBLICATIONS

Machine translation of CN 103146361, Deng et al, Jun. 12, 2013.*

* cited by examiner

*Primary Examiner* — Frances Tischler
(74) *Attorney, Agent, or Firm* — Calfee, Halter & Griswold LLP

(57) ABSTRACT

The present subject matter relates to the drilling fluid field, and discloses a viscosifier for oil-based drilling fluids and a method for preparing the viscosifier for oil-based drilling fluids. The preparation method comprises the following steps: (1) mixing an initiator with an unsaturated amide, an unsaturated organic sulfonic acid, and an unsaturated organic carboxylic acid in an aqueous phase solution and initiating a polymerization reaction with an oil phase solution that contains emulsifier and base oil, to obtain a polymer emulsion; (2) purifying and drying the polymer emulsion to obtain a composition; (3) mix the composition, sepiolite powder, and an acid while stirring, and then drying the obtained mixture. The viscosifier for oil-based drilling fluids disclosed in the present subject matter can make up for the shortage of viscosifiers for oil-based drilling fluids in the art, and has favorable temperature tolerance property, viscosity improvement property and environmental friendliness.

14 Claims, No Drawings

OIL-BASED VISCOSIFIER OF DRILLING FLUID AND THE PREPARATION METHOD THEREOF

CROSS REFERENCE TO RELATED APPLICATIONS

This application claims priority to Chinese Patent Application No. 201510158572.7 filed on Apr. 3, 2015 and entitled "AN OIL-BASED VISCOSIFIER OF DRILLING FLUID AND THE PREPARATION METHOD THEREOF", the entire content of which is fully incorporated here by reference.

FIELD OF THE INVENTION

The present subject matter relates to a method for preparing an oil-based viscosifier of drilling fluid and an oil-based viscosifier of drilling fluid prepared with the preparation method.

BACKGROUND OF THE INVENTION

In the drilling process, a viscosifier is usually added to improve the viscosity of low-solid drilling fluid, to ensure the drilling fluid has high viscosity and favorable rheological property. Besides attaining a viscosity improvement effect, a viscosifier for drilling fluids often also serves as shale inhibitor (coater), filtrate reducer, and flow pattern improver, etc. For extended reach wells, high-gradient wells, horizontal wells, high-temperature and high-pressure formations, and various sensitive formations, oil-based muds exhibit advantages such as good lubrication and formation protection performance, tolerance to contaminants and solid phases, and high contamination resistance, etc. An oil-based viscosifier of drilling fluid is an important constituent of an oil-based drilling fluid, and it can improve the viscous shearing force of the oil-based drilling fluid and ensure favorable floating, cuttings carrying, and filtrate loss reduction performance of the oil-based drilling fluid. However, the researches on viscosifiers for drilling fluids made in China and foreign countries mainly focus on the domain of viscosifiers for water-based drilling fluids, and few researches on viscosifiers for oil-based drilling fluids have been made.

There are mainly kinds of viscosifiers for drilling fluids. Commonly used viscosifiers include: modified cellulose, modified guar gum, xanthan gum, and synthetic acrylamide polymers, etc., but most of them are applicable only to water-based drilling fluids. Owing to the fact that most viscosifiers for water-based drilling fluids can spread effectively and be dissolved completely in water but the polymer molecules of these viscosifiers for water-based drilling fluids can't spread in oil-based drilling fluids, especially in pure oil-based drilling fluids that don't contain water, these viscosifiers for water-based drilling fluids can't take a viscosity and shearing strength improving effect in oil-based drilling fluids. Hence, most viscosifiers for water-based drilling fluids are inapplicable to oil-based drilling fluids. At present, viscosity improvement for oil-based drilling fluids is mainly realized by virtue of the viscosity improvement effect that comes with some materials, such as organic clay and filtrate reducing polymers for oil-based drilling fluids. Sometimes, the quantity of organic clay or filtrate reducing polymer for oil-based drilling fluids has to be increased in order to attain required viscosity and shearing force in the drilling fluid, resulting in increased cost of the oil-based drilling fluid. In addition, since the temperature of the drilling fluid increases as the well depth increases, the requirement for temperature tolerance of the viscosifier is higher when the viscosifier is used in drilling fluids to be applied in deep wells. In addition, environmental friendliness is also an important aspect of concern in the use of oil-based drilling fluids. Further improvements must be made to the environmental friendliness of existing oil-based drilling fluids. Developing and using environment-friendly oil-based drilling fluid materials, such as environment-friendly viscosifiers for oil-based drilling fluids, will be beneficial for the environmental friendliness of oil-based drilling fluids.

SUMMARY OF THE INVENTION

To overcome the above-mentioned drawbacks in existing viscosifiers for drilling fluids in the art, the present subject matter provides a method for preparing an oil-based viscosifier of drilling fluid and a viscosifier for oil-based drilling fluids prepared with the preparation method. the viscosifier for oil-based drilling fluids provided in the present subject matter can make up for the shortage of viscosifiers for oil-based drilling fluids in the art, and has favorable temperature tolerance property, viscosity improvement property and environmental friendliness.

the inventor has found accidentally: when sepiolite powder is added in the preparation process of an oil-based viscosifier of drilling fluid, the viscosifier for oil-based drilling fluids obtained finally will have a better viscosity improvement effect, be adaptive to more organic drilling fluid systems, and have better temperature tolerance.

The present subject matter provides a method for preparing a viscosifier for oil-based drilling fluid, comprising the following steps:

(1) mixing an initiator with an unsaturated amide, an unsaturated organic sulfonic acid, and an unsaturated organic carboxylic acid in an aqueous phase solution and initiating a polymerization reaction with an oil phase solution that contains emulsifier and base oil, to obtain a polymer emulsion;

(2) purifying and drying the polymer emulsion, to obtain a composition;

(3) mixing the composition, sepiolite powder, and an acid while stirring, and then drying the obtained mixture.

The present subject matter further provides a viscosifier product for oil-based drilling fluids prepared with the preparation method disclosed in the present subject matter.

Compared with existing viscosifiers for drilling fluids, the viscosifier for oil-based drilling fluids disclosed in the present subject matter has the following advantages:

(1) It is more applicable to oil-based drilling fluids and more adaptive to various oil-based drilling fluids (e.g., pure oil-based drilling fluids and various invert oil-emulsion drilling fluids), and can alleviate the predicament that viscosifiers for oil-based drilling fluids are in short;

(2) It has outstanding viscosity improvement property, and can still maintain good viscosity improvement property at high temperatures (e.g., above 200° C.);

(3) As an important raw material, sepiolite powder is widely available and cheap; in addition, as a natural product, sepiolite powder has favorable environmental friendliness.

Other aspects and advantages of the present subject matter will be further detailed in the embodiments hereunder.

DETAILED DESCRIPTION

Hereunder some embodiments of the present subject matter will be detailed. It should be appreciated that the embodiments described here are only provided to describe and explain the present subject matter, but shall not be deemed as constituting any limitation to the present subject matter.

The present subject matter provides a method for preparing an oil-based drilling fluid viscosifier, comprising the following steps:

(1) mixing an initiator with an unsaturated amide, an unsaturated organic sulfonic acid, and an unsaturated organic carboxylic acid in aqueous phase solution and initiating a polymerization reaction with an oil phase solution that contains emulsifier and base oil, to obtain a polymer emulsion;
(2) purifying and drying the polymer emulsion, to obtain a composition;
(3) mixing the composition, sepiolite powder, and an acid while stirring, and then drying the obtained mixture.

In step (1), the inventor has found: a product with better temperature tolerance and viscosity improvement properties can be obtained by blending unsaturated amide, unsaturated organic sulfonic acid, and unsaturated organic carboxylic acid at an appropriate ratio. Through numerous tests, the inventor has found: in another embodiment, the ratio of concentrations of the unsaturated amide, unsaturated organic sulfonic acid, and unsaturated organic carboxylic acid is: in relation to 100 pbw water, the concentration of the unsaturated amide is 14-28 pbw, the concentration of the unsaturated organic sulfonic acid is 4-12 pbw, and the concentration of the unsaturated organic carboxylic acid is 2-6 pbw; in another embodiment, in relation to 100 pbw water, the concentration of the unsaturated amide is 20-25 pbw, the concentration of the unsaturated organic sulfonic acid is 8-10 pbw, and the concentration of the unsaturated organic carboxylic acid is 4-5 pbw.

In step (1), the method for preparing the aqueous phase solution can comprise: dissolving unsaturated amide, unsaturated organic sulfonic acid, and unsaturated organic carboxylic acid in water while stirring. There is particular restriction on the conditions of the stirring, as long as the unsaturated amide, unsaturated organic sulfonic acid, and unsaturated organic carboxylic acid can be fully dissolved in water. In another embodiment, the conditions of the stirring include: 2,500-3,500 r/min. stirring rate and 0.8-1.2 h stirring time.

In step (1), the unsaturated amide can be any unsaturated amide commonly used in the art. For example, the unsaturated amide can be selected from one or more of $C_3$-$C_8$ polybasic alkenyl amides, preferably is selected from one or more of $C_3$-$C_4$ monobasic alkenyl amides and dibasic alkenyl amides, wherein, the $C_3$-$C_4$ monobasic alkenyl amides can be acrylamide, methacrylamide, and N-hydroxy methacrylamide, for example; the $C_3$-$C_4$ dibasic alkenyl amides can be N,N'-methylene-bis acrylamide, for example. The unsaturated organic sulfonic acid can be any unsaturated organic sulfonic acid commonly used in the art, preferably is allyl sulfonic acid and/or methallyl sulfonic acid. The unsaturated organic carboxylic acid can be any unsaturated organic carboxylic acid commonly used in the art, preferably is acrylic acid and/or maleic anhydride.

In step (1), the method for preparing the oil phase solution can comprise: mixing an emulsifier with base oil while stirring. There is particular restriction on the conditions of the stirring, as long as the emulsifier can be fully dissolved in the base oil. In another embodiment, the conditions of the stirring include: 2,500-3,500 r/min. stirring rate and 0.8-1.2 h stirring time. The concentration of the emulsifier can be a concentration of emulsifier conventionally used for preparing a viscosifier for drilling fluids in the art, for example, the concentration can be 20-40:100. The inventor has found: when the mass ratio of the emulsifier to base oil is 20-40:100, a product with better temperature tolerance and viscosity improvement properties can be obtained.

In step (1), the emulsifier can be of an emulsifier type conventionally used for preparing a viscosifier for drilling fluids in the art. For example, the emulsifier can be selected from one or more of Span-80, Span-60, Tween-20, Tween-60, Emulsifier OP-10, Emulsifier Span-80, and Emulsifier TX-100, etc., preferably is Emulsifier OP-10 and/or Emulsifier Span-80.

In step (1), the base oil can be of a base oil type conventionally used for preparing a viscosifier for drilling fluids in the art. For example, the base oil can be selected from one or more of dimethyl silicon oil, white oil, soybean oil, and maize oil, etc., preferably is white oil, more preferably is White Oil 3#.

In step (1), the conditions of the polymerization reaction include: adding the aqueous phase solution in droplets into the oil phase solution while stirring at 30-50° C., and then adding an initiator and continue stirring for 3-5 h. By adding the aqueous phase solution in droplets into the oil phase solution while stirring, the distribution of aqueous phase and oil phase in the mixed solution obtained in a such mixing approach will be more uniform, and the substances can contact with each other more intensively; the stirring is preferably low-speed stirring, for example, at 200-400 r/min. stirring rate; the dropwise adding rate can be 1-3 mL/min., preferably is 1-2 mL/min., and there is no particular restriction on the method of dropwise adding; preferably, the dropwise adding is carried out through a separating funnel. The weight ratio of the aqueous phase solution to the oil phase solution is preferably 1:1.1-1.3. The concentration of the initiator can be any conventional concentration in the art. For example, the concentration of the initiator can be 0.03-0.07 wt % of the total weight of the aqueous phase solution and the oil phase solution. The initiator can be of an initiator type conventionally used for preparing a viscosifier for drilling fluids in the art; in the solution system used in the present subject matter, preferably di(2-ethylhexyl) peroxydicarbonate (EHP) is used as the initiator.

In step (2), a composition is obtained after the polymer emulsion obtained in step (1) is purified and dried. The purification and drying process can be a conventional process used in the art. For example, it can comprise: purifying the polymer emulsion with acetone, wherein, the operating method is a conventional operating method for purification in the art, and those having ordinary skills in the art can regulate and control the concentration of the acetone in the process according to the physical circumstance; the drying temperature and time can be conventional ones; preferably, the drying temperature is 80-85° C., and the drying time is 4-6 h.

In step (3), the composition is mixed with sepiolite powder and an acid while they are stirred, and then the resultant mixture is dried. The inventor has found: sepiolite powder can work with the composition obtained in the present subject matter to exert a synergistic effect, so that the viscosifier has a better viscosity improvement effect, is adaptive to more organic drilling fluid systems, and has a better temperature tolerance property. The weight ratio of the sepiolite powder to the composition is preferably 1:1.5-2.5. The sepiolite used in the present subject matter can be any conventional sepiolite that is available commercially, and the average particle diameter of the sepiolite powder can be 50-100 μm, preferably is 60-80 μm.

In step (3), there is no particular restriction on the acid. In other words, any conventional acid can be applied in the present subject matter. For example, the acid can be hydrochloric acid, and the concentration of the hydrochloric acid can be 10-20 wt %, for example.

In step (3), there is no particular restriction on the conditions of the stirring. For example, the conditions of the stirring can include: 2,500-3,500 r/min. stirring rate and 1.5-2.5 h stirring time.

In step (3), there is no particular restriction on the conditions of the drying. In another embodiment, the drying temperature is 80-85° C., and the drying time is 4-6 h.

The present subject matter further provides an oil-based viscosifier of drilling fluid prepared with the preparation method disclosed in the present subject matter. The viscosifier for oil-based drilling fluids has favorable temperature tolerance property, viscosity improvement property, and environmental friendliness, and can make up for the shortage of viscosifiers for oil-based drilling fluids in the art at present.

The application method of the viscosifier for oil-based drilling fluids provided in the present subject matter can be a conventional application method in the art. For example, the viscosifier for oil-based drilling fluids can be mixed with a base mud before it is applied. The concentration of the viscosifier for oil-based drilling fluids provided in the present subject matter can be a concentration of viscosifier conventionally used for preparing an oil-based drilling fluid in the art. For example, based on the weight of the base mud, the concentration of the viscosifier for oil-based drilling fluids provided in the present subject matter can be 0.1-1.0 wt %, preferably is 0.3-0.8 wt %.

Hereunder the present subject matter will be further detailed in some embodiments.

In the following examples and comparative examples, SPAN-80 is purchased from Jiangsu Haian Petrochemical Plant, OP-10 is purchased from Guangzhou Chuangyue Chemicals Co., Ltd., White Oil 3# is purchased from Maoming Hongtai Petrochemicals Co., Ltd., the initiator di(2-ethylhexyl) peroxydicarbonate (EHP) is purchased from Sida Chemical Catalysts Co., Ltd., the sepiolite powder is purchased from Lingshou Shengheng Minerals Processing Plant, and dimethyl silicon oil is purchased from Guangzhou Junwang Biotechnology Co., Ltd.

Example 1

(1) Mix acrylamide, allyl sulfonic acid, acrylic acid, and water at 20:8:4:100 mass ratio and stir at 3,000 r/min. stirring rate for 1 h at room temperature, so that they are fully dissolved and form an aqueous phase solution;
(2) Mix SPAN-80, OP-10, White Oil 3# at 20:10:100 mass ratio and stir at 3,000 r/min. stirring rate for 1 h at room temperature, so that they are fully dissolved and form an oil phase solution;
(3) At 1:1.2 mass ratio between the aqueous phase solution and the oil phase solution, add the aqueous phase solution in droplets through a separating funnel at 1 mL/min adding rate into the oil phase solution while stirring, and then add initiator EHP that accounts for 0.05 wt % of the mixed solution;
(4) Control the mixed solution to have a polymerization reaction for 4 h under the conditions of 40° C. temperature and 300 r/min. stirring rate, to obtain a polymer emulsion;
(5) Add acetone into the polymer emulsion for purification, and then drying for 5 h in a drying oven at 85° C. temperature to obtain a composition; dissolve the composition together with sepiolite powder in 60 μm average particle diameter at 60:40 mass ratio in hydrochloric acid solution, stir for 2 h at 3,000 r/min. stirring rate, and drying for 5 h in a drying oven at 85° C. temperature; thus, a final product is obtained.

Example 2

(1) Mix methacrylamide, methallyl sulfonic acid, maleic anhydride, and water at 25:10:5:100 mass ratio and stir at 2,500 r/min. stirring rate for 1.2 h at room temperature, so that they are fully dissolved and form an aqueous phase solution;
(2) Mix SPAN-80 and White Oil 3# at 20:100 mass ratio and stir at 2,500 r/min. stirring rate for 1.2 h at room temperature, so that they are fully dissolved and form an oil phase solution;
(3) At 1:1.1 mass ratio between the aqueous phase solution and the oil phase solution, add the aqueous phase solution in droplets through a separating funnel at 2 mL/min adding rate into the oil phase solution while stirring, and then add initiator EHP that accounts for 0.03 wt % of the mixed solution;
(4) Control the mixed solution to have a polymerization reaction for 3 h under the conditions of 45° C. temperature and 400 r/min. stirring rate, to obtain a polymer emulsion;
(5) Add acetone into the polymer emulsion for purification, and then drying for 4 h in a drying oven at 85° C. temperature to obtain a composition; dissolve the composition together with sepiolite powder in 80 μm average particle diameter at 70:30 mass ratio in hydrochloric acid solution, stir for 2.5 h at 2,500 r/min. stirring rate, and drying for 4 h in a drying oven at 85° C. temperature; thus, a final product is obtained.

Example 3

(1) Mix N,N'-methylene-bis acrylamide, allyl sulfonic acid, acrylic acid, and water at 25:8:4:100 mass ratio and stir at 3,500 r/min. stirring rate for 0.8 h at room temperature, so that they are fully dissolved and form an aqueous phase solution;
(2) Mix OP-10 and White Oil 3# at 30:100 mass ratio and stir at 3,500 r/min. stirring rate for 0.8 h at room temperature, so that they are fully dissolved and form an oil phase solution;
(3) At 1:1.3 mass ratio between the aqueous phase solution and the oil phase solution, add the aqueous phase solution in droplets through a separating funnel at 1.5 mL/min adding rate into the oil phase solution while stirring, and then add initiator EHP that accounts for 0.07 wt % of the mixed solution;
(4) Control the mixed solution to have a polymerization reaction for 5 h under the conditions of 30° C. temperature and 200 r/min. stirring rate, to obtain a polymer emulsion;
(5) Add acetone into the polymer emulsion for purification, and then drying for 6 h in a drying oven at 80° C. temperature to obtain a composition; dissolve the composition together with sepiolite powder in 70 μm average particle diameter at 65:35 mass ratio in hydrochloric acid solution, stir for 1.5 h at 3,500 r/min. stirring rate, and drying for 6 h in a drying oven at 80° C. temperature; thus, a final product is obtained.

Example 4

(1) Mix N-hydroxy methacrylamide, methallyl sulfonic acid, maleic anhydride, and water at 15:11:6:100 mass ratio and stir at 3,800 r/min. stirring rate for 1 h at room temperature, so that they are fully dissolved and form an aqueous phase solution;
(2) Mix SPAN-80, OP-10, and dimethyl silicon oil at 20:20:100 mass ratio and stir at 3,800 r/min. stirring rate for 1 h at room temperature, so that they are fully dissolved and form an oil phase solution;

(3) At 1:1.4 mass ratio between the aqueous phase solution and the oil phase solution, add the aqueous phase solution in droplets through a separating funnel at 3 mL/min adding rate into the oil phase solution while stirring, and then add initiator EHP that accounts for 0.08 wt % of the mixed solution;

(4) Control the mixed solution to have a polymerization reaction for 1 h under the conditions of 60° C. temperature and 450 r/min. stirring rate, to obtain a polymer emulsion;

(5) Add acetone into the polymer emulsion for purification, and then drying for 6 h in a drying oven at 90° C. temperature to obtain a composition; dissolve the composition together with sepiolite powder in 100 μm average particle diameter at 75:25 mass ratio in hydrochloric acid solution, stir for 1.2 h at 3,800 r/min. stirring rate, and drying for 6 h in a drying oven at 90° C. temperature; thus, a final product is obtained.

Comparative Example 1

According to the method disclosed in the example 1 in Chinese Patent CN103146361A, an oil-based viscosifier of drilling fluid is obtained.

Comparative Example 2

According to the method described in the example 1, but replace the sepiolite powder with rosin powder in step (5).

Comparative Example 3

According to the method described in the example 1, but do not perform the process of mixing with the sepiolite powder in step (5), i.e., the composition is the final product.

Assessment of Properties

Carry out assessment of properties for the viscosifier products for oil-based drilling fluids obtained in the examples and comparative examples with the following assessment methods:

1. Appearance

Observe the appearance of the products visually in natural light. The results are shown in Table 1.

2. Density

Measure the density values of the products with a drilling fluid densimeter as per GB/T 16783.2-2012. The results are shown in Table 1.

3. Assessment of Viscosity Improvement Property 3.1 Preparing Base Muds for the Oil-Based Drilling Fluids Three types of base muds for the oil-based drilling fluids are prepared:

(1) Base mud I: diesel oil-based base mud for drilling fluids: 85:15 oil/water mass ratio (diesel oil (Maoming Guangxing Lubricants Co., Ltd., diesel oil 0#): 30 wt % $CaCl_2$ solution)+1 wt % organic clay (Xinyang Pingqiao Xiushan Bentonite Plant, organophilic bentonite powder)+1 wt % CaO;

(2) Base mud II: white oil-based base mud for drilling fluids: 85:15 oil/water mass ratio (white oil (Foshan Zhaorongke Lubricant Co., Ltd., industrial-grade white oil): 30 wt % $CaCl_2$ solution)+1 wt % organic clay (Xinyang Pingqiao Xiushan Bentonite Plant, organophilic bentonite powder)+1 wt % CaO;

(3) Base mud III: clay-free oil-based drilling fluid: 85:15 oil/water mass ratio (white oil (Foshan Zhaorongke Lubricant Co., Ltd., industrial-grade white oil): 30 wt % $CaCl_2$ solution)+1 wt % shearing strength improver (Wuji Tianxing Lubricant Processing Plant, Shearing Strength Improver TQ for oil-based drilling fluids)+1 wt % CaO.

The method for preparing the base mud comprises: adding the substances in the formulation sequentially and mixing them to a homogeneous state by stirring.

3.2 Assessment of Viscosity Improvement Property of the Oil-Based Drilling Fluids Take 8 samples (each sample is 100 mL volume) from the three prepared base muds respectively, use 1 sample for blank control, and add 0.5 wt % (based on the weight of the base mud) viscosifier products for oil-based drilling fluids obtained in the samples 1-4 and the comparative examples 1-3 into the rest 7 samples respectively while stirring; after the samples are stirred to a homogeneous state, measure the φ 600, φ 300, φ 200, φ 100, φ 6, and φ 3 viscosity values of the oil-based drilling fluids with a six-speed rotational viscometer as per GB/T 16783.2-2012 respectively, and then calculate the apparent viscosity (AV), plastic viscosity (PV), yield point (YP), and 10 s and 10 min. gel strength values (G10″/10′), and measure the filter loss (API) of the oil-based drilling fluids with an API filter tester respectively. The test results based on the base muds I, II, and III are shown in the column "Before Aging" in Table 2, Table 3, and Table 4 respectively.

4. Temperature Tolerance

Repeat the above viscosity improvement property test, but treat the materials to be tested by aging for 16 h at a high temperature before data measurement. The results are shown in the column "After Aging" in Tables 2-4 respectively.

TABLE 1

| | Appearance | Density (g/cm³) |
|---|---|---|
| Example 1 | White solid fiber | 1.19 |
| Example 2 | White solid fiber | 1.19 |
| Example 3 | White solid fiber | 1.19 |
| Example 4 | White solid fiber | 1.19 |
| Comparative example 1 | White solid powder | 1.14 |
| Comparative example 2 | Dark yellow solid powder | 1.05 |
| Comparative example 3 | White solid powder | 1.15 |

TABLE 2

| | | | AV (mPa·s) | PV (mPa·s) | YP (Pa) | G10″/10′ (Pa/Pa) | API (mL) |
|---|---|---|---|---|---|---|---|
| Before Aging | Base mud I + 0.5% | Base mud I - blank | 27 | 19 | 8 | 2.0/3.5 | 2.2 |
| | | Example 1 | 82 | 61 | 21 | 4.2/9.0 | 0.8 |
| | | Example 2 | 75 | 56 | 19 | 4.0/8.2 | 1.0 |
| | | Example 3 | 78 | 59 | 19 | 4.0/8.3 | 1.1 |
| | | Example 4 | 70 | 52 | 18 | 3.5/8.0 | 1.5 |
| | | Comparative example 1 | 74 | 55 | 19 | 4.5/7.5 | 0.9 |
| | | Comparative example 2 | 60 | 48 | 12 | 4.0/7.0 | 1.9 |
| | | Comparative example 3 | 73 | 54 | 19 | 4.5/7.58 | 0.9 |
| After Aging at 200° C. | Base mud I + 0.5% | Base mud I - blank | 27 | 16 | 11 | 2.0/3.5 | 2.5 |
| | | Example 1 | 78 | 59 | 19 | 3.8/8.4 | 1.0 |
| | | Example 2 | 69 | 55 | 14 | 3.5/7.8 | 1.2 |
| | | Example 3 | 73 | 55 | 18 | 3.5/8.0 | 1.2 |
| | | Example 4 | 65 | 50 | 15 | 3.3/7.5 | 1.4 |
| | | Comparative example 1 | 60 | 47 | 13 | 3.7/7.0 | 1.1 |
| | | Comparative example 2 | 57 | 43 | 14 | 3.0/6.4 | 1.6 |
| | | Comparative example 3 | 62 | 46 | 16 | 3.5/7.0 | 1.1 |

TABLE 3

| | | AV (mPa·s) | PV (mPa·s) | YP (Pa) | G10"/10' (Pa/Pa) | API (mL) |
|---|---|---|---|---|---|---|
| Before Aging | Base mud II - blank | 36 | 24 | 12 | 3.0/4.5 | 2.0 |
| | Base mud II + 0.5% Example 1 | 91 | 69 | 22 | 6.0/12 | 0.6 |
| | Example 2 | 81 | 62 | 19 | 5.0/11 | 0.8 |
| | Example 3 | 85 | 65 | 20 | 6.0/12 | 0.8 |
| | Example 4 | 73 | 57 | 16 | 6.0/11.5 | 1.1 |
| | Comparative example 1 | 75 | 60 | 15 | 4.5/10.5 | 1.3 |
| | Comparative example 2 | 68 | 48 | 20 | 4.3/10 | 1.6 |
| | Comparative example 3 | 74 | 61 | 13 | 4.5/10.7 | 1.3 |
| After Aging at 230° C. | Base mud II - blank | 36 | 22 | 14 | 2.0/4.0 | 2.0 |
| | Base mud II + 0.5% Example 1 | 86 | 63 | 23 | 5.5/11 | 0.6 |
| | Example 2 | 77 | 60 | 17 | 4.0/10 | 0.8 |
| | Example 3 | 80 | 64 | 16 | 5.0/11 | 0.8 |
| | Example 4 | 70 | 55 | 15 | 5.0/11 | 0.8 |
| | Comparative example 1 | 74 | 55 | 19 | 3.8/9.7 | 1.2 |
| | Comparative example 2 | 64 | 49 | 15 | 3.5/9 | 1.9 |
| | Comparative example 3 | 74 | 54 | 20 | 4.0/10 | 1.3 |

TABLE 4

| | | AV (mPa·s) | PV (mPa·s) | YP (Pa) | G10"/10' (Pa/Pa) | API (mL) |
|---|---|---|---|---|---|---|
| Before Aging | Base mud III - blank | 30 | 21 | 9 | 2.5/3.8 | 2.2 |
| | Base mud III + 0.5% Example 1 | 88 | 65 | 23 | 6/12 | 0.8 |
| | Example 2 | 77 | 56 | 21 | 5.0/11 | 1.0 |
| | Example 3 | 81 | 60 | 21 | 6.0/11 | 1.1 |
| | Example 4 | 72 | 52 | 20 | 5.5/10 | 1.2 |
| | Comparative example 1 | 70 | 54 | 16 | 4.5/10.8 | 1.5 |
| | Comparative example 2 | 65 | 51 | 14 | 4.5/10 | 2.0 |
| | Comparative example 3 | 72 | 52 | 20 | 4.6/10.5 | 1.5 |
| After Aging at 250° C. | Base mud III - blank | 30 | 21 | 9 | 2.5/3.8 | 2.4 |
| | Base mud III + 0.5% Example 1 | 84 | 62 | 22 | 5.0/11 | 0.8 |
| | Example 2 | 74 | 54 | 20 | 5.0/10 | 1.0 |
| | Example 3 | 78 | 59 | 19 | 6.0/11 | 1.2 |
| | Example 4 | 65 | 47 | 18 | 5.5/11 | 1.6 |
| | Comparative example 1 | 60 | 43 | 17 | 5.0/10 | 1.8 |
| | Comparative example 2 | 62 | 46 | 16 | 4.5/9.5 | 2.0 |
| | Comparative example 3 | 62 | 47 | 15 | 5.1/10.3 | 1.8 |

It can be seen through comparison between the examples and the comparative examples: the viscosifier for oil-based drilling fluids provided in the present subject matter has a better viscosity improvement property than the viscosifiers for oil-based drilling fluids in the comparative examples, and has a viscosity improvement property apparently superior to that of the viscosifiers for oil-based drilling fluids in the comparative examples after high temperature aging. Thus, it is proved that the viscosifier for oil-based drilling fluids provided in the present subject matter has a better temperature tolerance property.

While some preferred embodiments of the present invention are described above, the present invention is not limited to the details in those embodiments. Those skilled in the art can make modifications and variations to the technical scheme of the present invention, without departing from the spirit of the present invention. However, all these modifications and variations shall be deemed as falling into the protected scope of the present invention.

What is claimed is:

1. A method for preparing a viscosifier for an oil-based drilling fluid, comprising:
   (1) mixing an initiator with an unsaturated amide, an unsaturated organic sulfonic acid, and at least one of acrylic acid and maleic anhydride in an aqueous phase solution and initiating a polymerization reaction with an oil phase solution that contains an emulsifier and a base oil, to obtain a polymer emulsion;
   (2) purifying and drying the polymer emulsion, to obtain a composition;
   (3) dissolving the composition and a sepiolite powder in an acid while stirring, and then drying the obtained mixture.

2. The method according to claim 1 wherein in the aqueous phase solution of (1), in relation to 100 pbw water, the concentration of the unsaturated amide is 14-28 pbw, the concentration of the unsaturated organic sulfonic acid is 4-12 pbw, and the concentration of the unsaturated organic carboxylic acid is 2-6 pbw.

3. The method according to claim 1 wherein the unsaturated amide is selected from one or more of acrylamide, methacrylamide, N,N'-methylene-bis acrylamide, and N-hydroxy methacrylamide.

4. The method according to claim 1 wherein the unsaturated organic sulfonic acid is allyl sulfonic acid and/or methallyl sulfonic acid.

5. The method according to claim 1 wherein the mass ratio of the emulsifier to the base oil in the oil phase solution is 20-40:100.

6. The method according to claim 1 wherein the base oil is white oil.

7. The method according to claim 1 wherein the weight ratio of the aqueous phase solution to the oil phase solution is 1:1.3 to 1:1.1.

8. The method according to claim 1 wherein the concentration of the initiator is 0.03-0.07 wt % of the total weight of the aqueous phase solution and the oil phase solution.

9. The method according to claim 8 wherein the initiator is di(2-ethylhexyl) peroxydicarbonate.

10. The method according to claim 1 wherein prior to initiating the polymerization reaction, adding the aqueous phase solution in droplets into the oil phase solution while stirring at 30-50° C., and then adding the initiator to initiate the polymerization and continue stirring for 3-5 h.

11. The method according to claim 10 wherein the stirring rate is 200-400 r/min., and wherein the dropwise adding is carried out through a separating funnel.

12. The method according to claim 1 wherein a weight ratio of the sepiolite powder to the obtained composition is 1:1.5-2.5.

13. The method according to claim 1 wherein the average particle diameter of the sepiolite powder is 60-80 μm.

14. The method according to claim 1 wherein the conditions of the stirring of (3) comprise: 2,500-3,500 r/min. stirring rate and 1.5-2.5 h stirring time.

* * * * *